United States Patent
Kang et al.

(10) Patent No.: US 12,157,105 B2
(45) Date of Patent: Dec. 3, 2024

(54) NEUTRALIZING ABSORBENT FOR DECONTAMINATING LEAKED CHEMICAL SUBSTANCE, METHOD OF PREPARING THE SAME, AND NEUTRALIZER FILLED WITH THE SAME

(71) Applicant: GTScien Co., Ltd., Daejeon (KR)

(72) Inventors: Yeon Kyun Kang, Daejeon (KR); Seok Je Hong, Gyeonggi-do (KR)

(73) Assignee: GTScien Co., Ltd., Daejeon (KR)

( * ) Notice: Subject to any disclaimer, the term of this patent is extended or adjusted under 35 U.S.C. 154(b) by 743 days.

(21) Appl. No.: 17/432,957

(22) PCT Filed: Mar. 29, 2021

(86) PCT No.: PCT/KR2021/003882
§ 371 (c)(1),
(2) Date: Aug. 23, 2021

(87) PCT Pub. No.: WO2021/201543
PCT Pub. Date: Oct. 7, 2021

(65) Prior Publication Data
US 2022/0339599 A1    Oct. 27, 2022

(30) Foreign Application Priority Data
Mar. 31, 2020   (KR) .................. 10-2020-0039502

(51) Int. Cl.
*B01J 20/16*    (2006.01)
*B01J 20/08*    (2006.01)
(Continued)

(52) U.S. Cl.
CPC ............. *B01J 20/165* (2013.01); *B01J 20/08* (2013.01); *B01J 20/106* (2013.01); *B01J 20/12* (2013.01);
(Continued)

(58) Field of Classification Search
None
See application file for complete search history.

(56) References Cited

U.S. PATENT DOCUMENTS 6,352,578 B1    3/2002   Sakata et al.
2007/0087444 A1    4/2007   England
(Continued)

FOREIGN PATENT DOCUMENTS

| CN | 1270539 | 10/2000 |
|---|---|---|
| CN | 102989113 | 3/2013 |

(Continued)

OTHER PUBLICATIONS

Machine translation of Zhang et al., CN102989113A (Year: 2012).*
(Continued)

*Primary Examiner* — Coris Fung
*Assistant Examiner* — Keling Zhang

(57) ABSTRACT

The present invention relates to a neutralizing absorbent for decontaminating a leaked chemical substance, a method of preparing the same, and a neutralizer filled with the same. The neutralizing absorbent for decontaminating a leaked chemical substance according to the present invention includes an inorganic adsorbent, which is commonly usable in neutralizing absorption of acidic, basic, and/or organic chemical substances, at 40 to 60 wt %, a thickener at 20 to 30 wt %, a surfactant at 20 to 30 wt %, and a color change indicator, and is formulated in a solid state.

6 Claims, 2 Drawing Sheets

(51) Int. Cl.
*B01J 20/10* (2006.01)
*B01J 20/12* (2006.01)
*B01J 20/28* (2006.01)
*B01J 20/30* (2006.01)

(52) U.S. Cl.
CPC ......... *B01J 20/28004* (2013.01); *B01J 20/30* (2013.01); *B01J 2220/46* (2013.01); *B01J 2220/66* (2013.01)

(56) References Cited

U.S. PATENT DOCUMENTS

| | | | |
|---|---|---|---|
| 2015/0315445 | A1 | 11/2015 | Neel et al. |
| 2019/0374804 | A1 | 12/2019 | May |

FOREIGN PATENT DOCUMENTS

| | | |
|---|---|---|
| CN | 102989115 | 3/2013 |
| CN | 106000358 | 10/2016 |
| JP | 2000-279802 | 10/2000 |
| KR | 07-136615 | 5/1995 |
| KR | 10-1996-0010030 | 4/1996 |
| KR | 10-0013446 | 5/1996 |
| KR | 10-1997-0009831 | 3/1997 |
| KR | 20-0272280 | 4/2002 |
| KR | 2002-143338 | 5/2002 |
| KR | 10-0442474 | 7/2004 |
| KR | 10-1409521 | 6/2014 |
| KR | 10-1592620 | 2/2016 |
| KR | 10-1605582 | 3/2016 |
| KR | 10-1951724 | 2/2019 |
| KR | 10-2038255 | 10/2019 |
| KR | 10-2020-0017592 | 2/2020 |
| KR | 10-2142494 | 8/2020 |
| WO | WO2011/034327 | 3/2011 |

OTHER PUBLICATIONS

Notification of Office Action and Search Report Dated Feb. 25, 2023 From the State Intellectual Property Office of the People's Republic of China Re. Application No. 202180002269.1. (5 Pages).
Supplementary European Search Report and the European Search Opinion Dated Nov. 16, 2022 From the European Patent Office Re. Application No. 21749761.9. (11 Pages).

* cited by examiner

NEUTRALIZING ABSORBENT FOR DECONTAMINATING LEAKED CHEMICAL SUBSTANCE, METHOD OF PREPARING THE SAME, AND NEUTRALIZER FILLED WITH THE SAME

RELATED APPLICATIONS

This application is a National Phase of PCT Patent Application No. PCT/KR2021/003882 having International filing date of Mar. 29, 2021, which claims the benefit of priority of Korean Patent Application No. 10-2020-0039502, filed on Mar. 31, 2020. The contents of the above applications are all incorporated by reference as if fully set forth herein in their entirety.

FIELD AND BACKGROUND OF THE INVENTION

The present invention relates to a neutralizing absorbent for decontaminating a leaked chemical substance, a method of preparing the same, and a neutralizer filled with the same, and more specifically, to a neutralizing absorbent for decontaminating a leaked chemical substance, a preparation method of the same, and a neutralizer filled with the same, which are useful in preventing secondary accidents by promptly, safely, and effectively neutralizing acidic, basic, and/or organic chemical substances such as hydrochloric acid, acetic acid, hydrofluoric acid, nitric acid, sulfuric acid, a sodium hydroxide or potassium hydroxide solution, hydrogen peroxide, ammonia water, toluene, benzene, and the like, which are leaked in the leakage accident of the chemical substance which may unexpectedly happen in laboratories or industrial sites, regardless of the type and characteristics thereof.

In recent years, chemical leakage accidents at industrial sites, such as hydrofluoric acid leakage accidents in Gumi and Cheongju, a hydrochloric acid leakage accident in Sangju, and the like, have caused a lot of damage to property and life. Also, chemical leakage accidents during experiments frequently happen in the laboratories of universities or research institutes that use a lot of various types of chemicals.

When such a chemical leakage accident happens, the absence of initial actions leads to more serious secondary accidents, so prompt and appropriate initial actions are particularly important in minimizing damage to property and life.

Currently, it is common to manually install a fence or spray an adsorbent or a neutralizer as an initial response method in the case of chemical leakage accidents. In the above-mentioned hydrofluoric acid leakage accident in Gumi, firefighters sprayed water onto hydrofluoric acid, which resulted in a more serious accident.

As conventional treatment for chemical leakage accidents, separate and strictly distinct methods have been used such as neutralization with a basic chemical in the case of acidic chemical leakage, neutralization with an acidic chemical in the case of basic chemical leakage, and treatment using an adsorbent or absorptive cloth in the case of organic chemical leakage.

When the type and nature of leaked chemical are not known or when a wrong neutralizer is used, it may lead to additional accidents. Also, a neutralizer conventionally used in acidic chemical leakage has concerns about secondary contamination due to a residual basic chemical when used in excess.

A conventional neutralizer for acidic or basic use always has concerns about diffusion because water is generated by the reaction of an acid and base when the neutralizer is used and thus an unreacted neutralizing agent and water are mixed.

In addition, since it is necessary to selectively use a neutralizer according to the type of leaked chemical, an initial action is delayed, and since it is difficult for a person who takes an initial action to accurately determine an appropriate usage amount, neutralization and decontamination are not promptly and appropriately achieved, and thus it is highly likely to additionally damage property and life.

Therefore, the conventional technique has a limitation in that a neutralizer for acidic or basic neutralization needs to be selectively used according to the type of leaked chemical and that there are clear restrictions on its use in the case of organic chemical leakage accidents.

Typical conventional techniques for decontamination as an initial action in the case of chemical leakage are as follows.

Korean Registered Patent No. 10-1605582 (registered on Mar. 16, 2016) discloses a neutralization device for neutralizing a leaked basic chemical, which includes a stored pressure body container containing a neutralizing agent for neutralizing a basic chemical; and a discharge unit including a lever for spraying a neutralizing agent, a discharge hose, and a safety pin which are mounted on the body container, wherein the stored pressure body container contains a surfactant and is in a pressurized state at 7 to 9.8 kgf/cm$^2$, and the neutralizing agent is citric acid, fumaric acid, diluted hydrochloric acid, acetic acid, or any mixture thereof.

In addition, Korean Laid-Open Patent Publication No. 10-1996-0010030 (published on Feb. 14, 1996) discloses an acidic neutralizing agent composition, which treats and removes a trace amount of leaked acid, poisonous gas, or the like and consists of a basic substance (triethanolamine) that is able to smoothly react in a neutralization reaction, a gas absorbing agent (diethanolamine) that easily absorbs and neutralizes leaked gas or gas generated in a neutralization reaction, alizarin red that allows a reaction state to be visually identified, and the like.

Additionally, Korean Laid-Open Patent Publication No. 10-1997-0009831 (published on Mar. 27, 1997) discloses a powdered acidic neutralizing agent composition, which treats and removes a trace amount of acid, poisonous gas, or the like and consists of a basic substance (anhydrous potassium carbonate, anhydrous sodium carbonate, magnesium oxide) that is able to smoothly react in a neutralization reaction, a gas absorbing agent that easily absorbs and neutralizes leaked gas or gas generated in a neutralization reaction, BTB (pigment) that allows a reaction state to be visually identified, and the like.

However, all of the above related art can be restrictively applied to specific types of acidic or basic chemicals and cannot be used for both acidic and basic chemicals. Furthermore, the above related art has a limitation that decontamination of organic chemicals is not possible.

In the following Table 1, the above related art is summarized and compared according to type.

TABLE 1

| | Company A (fire extinguisher type) | Company B (spraying type) | Company C (spraying type) |
|---|---|---|---|
| Product provision type | Fire extinguishers differentiated for acidic and basic use are provided. | Case where separate acidic and basic substances are stored in the bottle | Case where separate acidic and basic substances are stored in the bottle |
| Accident risk | Since spraying is made at a point at least 5 m away from the accident scene, the risk of fatal accidents is low. | Since a neutralizing agent must be directly sprayed while being closer to the accident scene, there is a concern about fatal accidents (poisonous gas is generated). | Since a neutralizing agent must be directly sprayed while being closer to the accident scene, there is a concern about fatal accidents (poisonous gas is generated). |
| Initial action | A relatively prompt initial action is possible. | An initial action is delayed. | An initial action is delayed. |
| Differentiation for acidic, basic, organic chemicals | It is necessary to separately provide neutralizers for acidic and basic use, and there is no neutralizer for organic chemicals. | It is necessary to find neutralizing agents suitable for acidic and basic use, and there is no neutralizer for organic chemicals. | It is necessary to find neutralizing agents suitable for acidic and basic use, and there is no neutralizer for organic chemicals. |
| Purification of poisonous gas | The evaporation of poisonous gas and liquid is suppressed by forming a foam using a surfactant. | It is impossible to suppress the evaporation of poisonous gas and liquid. | It is impossible to suppress the evaporation of poisonous gas and liquid. |
| Secondary contamination | There is a concern about secondary chemical contamination due to an unreacted neutralizing agent by an acid-base reaction. | There is a concern about secondary chemical contamination due to an unreacted neutralizing agent by an acid-base reaction. | There is a concern about secondary chemical contamination due to an unreacted neutralizing agent by an acid-base reaction. |

Meanwhile, Korean Utility Model Registration No. 20-0272280 (registered on Apr. 3, 2002) discloses a device for spraying a neutralizing agent of chlorine and ammonia gas, and Korean Registered Patent No. 10-1409521 (registered on Jun. 12, 2014) discloses a device for spraying wet and dry neutralizing agents, but they have a problem in that a chemical to be treated is limited to a specific type. Also, Korean Registered Patent No. 10-2038255 (registered on Oct. 23, 2019) discloses a vehicle-mounted antiseptic spraying system, and Korean Registered Patent No. 10-1951724 (registered on Feb. 19, 2019) discloses a vehicle-mounted device for spraying a neutralizing agent, but they relate to a technique of using a vehicle to move to the accident scene and then performing treatment and are not portable types required for prompt initial actions.

RELATED-ART DOCUMENTS

Patent Documents (Patent Document 0001) Korean Registered Patent No. 10-1605582 (registered on Mar. 16, 2016)
(Patent Document 0002) Korean Laid-Open Patent Publication No. 10-1996-0010030 (published on Feb. 14, 1996)
(Patent Document 0003) Korean Laid-Open Patent Publication No. 10-1997-0009831 (published on Mar. 27, 1997)

SUMMARY OF THE INVENTION

The first objective of the present invention is to provide a neutralizing absorbent for decontaminating a leaked chemical substance, which is effective in promptly and safely taking an initial action regardless of the type, nature, and characteristics of acidic, basic, and/or organic chemical substances leaked in the leakage accident of the chemical substance, and accordingly, is useful in preventing more serious secondary accidents.

The second objective of the present invention is to provide a neutralizing absorbent for decontaminating a leaked chemical substance, which has no concerns about the spread of contamination due to water generated by an acid-base reaction and minimizes concerns about the additional occurrence of secondary contamination due to a decontaminating agent by using a non-toxic chemical absorbent during use.

The third objective of the present invention is to provide a neutralizing absorbent for decontaminating a leaked chemical substance, which allows a decontamination process to be visually checked in real time regardless of the type, nature, and characteristics of the leaked chemical substance.

The fourth objective of the present invention is to provide a method of effectively preparing the neutralizing absorbent for decontaminating a leaked chemical substance according to all the above-described objectives.

The fifth objective of the present invention is to provide a neutralizer filled with the neutralizing absorbent for decontaminating a leaked chemical substance according to the first to third objectives, which enables decontamination by being effectively applied to contamination sources.

The first to third objectives of the present invention can be smoothly achieved by a neutralizing absorbent for decontaminating a leaked chemical substance, which includes: 100 parts by weight of a neutralizing absorbent for decontamination, including an inorganic adsorbent, which is commonly usable in neutralizing absorption of at least one chemical substance selected from the group consisting of acidic, basic, and organic chemical substances, at 40 to 60 wt %, a thickener at 20 to 30 wt %, and a surfactant at 20 to 30 wt %; and 0.01 to 0.02 parts by weight of a color change indicator including methyl red or methyl orange, methylene blue, and phenolphthalein, wherein the inorganic adsorbent is at least one inorganic adsorbent selected from the group consisting of zeolite, alumina, perlite, and bentonite, and the neutralizing absorbent is formulated in a solid state.

The thickener may be silica gel, silica starch, starch, natural cellulose, Hycel, gelatin, or any mixture thereof, the surfactant may be polyethylene glycol, propylene glycol, or a mixture of polyethylene glycol and propylene glycol, and the color change indicator may further include a natural indicator.

The neutralizing absorbent for decontaminating a leaked chemical substance may have a moisture content of 5 to 10 wt %, but the present invention is not limited thereto.

In addition, the inorganic adsorbent may have an average particle diameter of 30 μm to 100 μm, and the neutralizing absorbent for decontaminating a leaked chemical substance may be formulated in the form of powder having an average particle diameter of 30 μm to 100 μm, a grain having an average particle diameter of 0.5 mm to 1.0 mm, or a pellet, granule, flake, or tablet having an average particle diameter of 1.5 to 3.0 mm.

The fourth objective of the present invention can be smoothly achieved by a method of preparing a neutralizing absorbent for decontaminating a leaked chemical substance, which includes the steps of: a) homogeneously mixing 40 to 60 wt % of at least one inorganic adsorbent selected from the group consisting of zeolite, alumina, perlite, and bentonite with an average particle diameter of 30 μm to 100 μm, which is commonly usable in neutralizing absorption of at least one chemical substance selected from the group consisting of acidic, basic, and organic chemical substances, 20 to 30 wt % of a thickener, and 20 to 30 wt % of a surfactant to prepare a neutralizing absorbent for decontamination; b) mixing 100 parts by weight of the neutralizing absorbent for decontamination with 0.01 to 0.02 parts by weight of a color change indicator including methyl red or methyl orange, methylene blue, and phenolphthalein; c) performing drying so that a moisture content is 5 to 10 wt %; and d) formulating the dried neutralizing absorbent for decontamination, which includes the color change indicator, in the form of powder having an average particle diameter of 30 μm to 100 μm, a grain having an average particle diameter of 0.5 mm to 1.0 mm, or a pellet, granule, flake, or tablet having an average particle diameter of 1.5 to 3.0 mm.

The fifth objective of the present invention can be smoothly achieved by a neutralizer for decontaminating a leaked chemical substance, which is filled with the above-described neutralizing absorbent for decontaminating a leaked chemical substance together with an inert gas or nitrogen gas and is in the form of a fire extinguisher or a stored pressure powder sprayer.

BRIEF DESCRIPTION OF THE SEVERAL VIEWS OF THE DRAWINGS

The above and other objects, features and advantages of the present invention will become more apparent to those of ordinary skill in the art by describing exemplary embodiments thereof in detail with reference to the accompanying drawings, in which.

DESCRIPTION OF SPECIFIC EMBODIMENTS OF THE INVENTION

Figure 1:
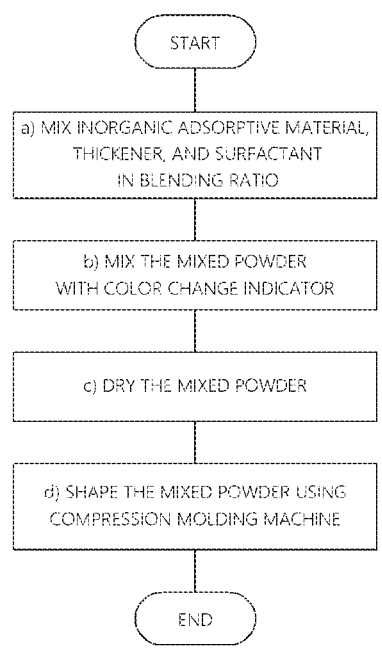
FIG. 1 shows an exemplary flowchart of a preparation method of a neutralizing absorbent for decontaminating a leaked chemical substance according to the present invention.

Hereinafter, the present invention will be described in detail with reference to the accompanying drawings.

It should be understood that the following description describes the present invention by way of specific examples, and the technical spirit of the present invention is not limited to the following description. Also, the accompanying drawings are provided to help understanding of the present invention, and the technical spirit of the present invention is not limited to the accompanying drawings.

Configuration of Neutralizing Absorbent for Decontaminating Leaked Chemical Substance A neutralizing absorbent for decontaminating a leaked chemical substance according to the present invention includes an inorganic adsorbent, which is commonly usable in neutralizing absorption of acidic, basic, and organic chemical substances, or any mixture thereof, a thickener, a surfactant, and a color change indicator and is formulated in a solid state.

The neutralizing absorbent for decontaminating a leaked chemical substance according to the present invention may be widely used in various applications such as absorption treatment of a chemical substance leaked in a leakage accident that may happen in laboratories, industrial sites, or the like, solidification treatment of a waste chemical, and the like.

The neutralizing absorbent for decontaminating a leaked chemical substance according to the present invention may be prepared by mixing a food additive, a cosmetic raw material, and a raw material commonly used in preparation of a chemical substance. The inorganic adsorbent may be zeolite, alumina, perlite, bentonite, or any mixture thereof, but the present invention is not limited thereto.

The inorganic adsorbent is included in an amount of 40 to 60 wt % with respect to the total weight of the neutralizing absorbent for decontaminating a leaked chemical substance according to the present invention. For example, when one type of the inorganic adsorbent is used, the one type of the inorganic adsorbent may be included in an amount of 40 to 60 wt % with respect to the total weight of the neutralizing absorbent for decontaminating a leaked chemical substance. When at least two types of the inorganic adsorbents are used, the total content of at least two types of the inorganic adsorbents may range from 40 to 60 wt % with respect to the total weight of the neutralizing absorbent for decontaminating a leaked chemical substance.

When the content of the inorganic adsorbent is less than 40 wt %, it may be difficult to achieve the performance of a neutralizing absorbent for decontamination, which is intended by the neutralizing absorbent for decontaminating a leaked chemical substance according to the present invention. On the other hand, when the content of the inorganic adsorbent exceeds 60 wt %, the activities of a thickener and a surfactant may be degraded, or absorption and gelation may not proceed well, thereby lowering an absorption rate.

In addition, the thickener may be silica gel, silica starch, starch, natural cellulose, Hycel, gelatin, or any mixture thereof, but the present invention is not limited thereto.

The thickener is included in an amount of 20 to 30 wt % with respect to the total weight of the neutralizing absorbent for decontaminating a leaked chemical substance. For example, when one type of the thickener is used, the one type of the thickener may be included in an amount of 20 to 30 wt % with respect to the total weight of the neutralizing absorbent for decontaminating a leaked chemical substance. When at least two types of the thickeners are used, the total content of at least two types of the thickeners may range from 20 to 30 wt % with respect to the total weight of the neutralizing absorbent for decontaminating a leaked chemical substance. When the content of the thickener is less than 20 wt %, it may be difficult to achieve the performance intended by the neutralizing absorbent for decontaminating a leaked chemical substance according to the present invention. On the other hand, when the content of the thickener exceeds 30 wt %, the activities of an inorganic adsorptive material and a surfactant may be degraded, or the thickener may clog the pores of the inorganic adsorptive material, thereby lowering an absorption rate.

In addition, the surfactant may be polypropylene glycol, polyethylene glycol, or a mixture thereof, but the present invention is not limited thereto.

The surfactant is included in an amount of 20 to 30 wt % with respect to the total weight of the neutralizing absorbent for decontaminating a leaked chemical substance. For example, when one type of the surfactant is used, the one type of the surfactant may be included in an amount of 20 to 30 wt % with respect to the total weight of the neutralizing absorbent for decontaminating a leaked chemical substance. When at least two types of the surfactants are used, the total content of at least two types of the surfactants may range from 20 to 30 wt % with respect to the total weight of the neutralizing absorbent for decontaminating a leaked chemical substance. When the content of the surfactant is less than 20 wt %, it may be difficult to achieve the performance of a neutralizing absorbent for decontamination, which is intended by the neutralizing absorbent for decontaminating a leaked chemical substance according to the present invention. On the other hand, when the content of the surfactant exceeds 30 wt %, the activities of an inorganic adsorptive material and a thickener may be degraded, or the surfactant may interfere with the function of a thickener, thereby lowering an absorption rate.

Meanwhile, the color change indicator may be methyl red, methyl orange, methylene blue, phenolphthalein, a natural indicator (red cabbage, eggplant, rose, etc.), or any mixture thereof, but the present invention is not limited thereto.

In this case, methyl red is an indicator that is red (pH 4.4)↔yellow (pH 6.2), methyl orange is an indicator that is red (pH 3.1)↔yellow (pH 4.4), phenolphthalein is an indicator that is red (pH 0)↔colorless↔purple (pH 8.2)↔colorless (pH 12), and methylene blue is an oxidation-reduction indicator that is deep blue in an oxidizing environment and light blue in a reducing environment.

In the neutralizing absorbent for decontaminating a leaked chemical substance according to the present invention, it is preferable that phenolphthalein for the neutralizing absorption and decontamination of the acidic chemical substance, methyl orange or methyl red for the neutralizing absorption and decontamination of the basic chemical substance, and an oxidation-reduction indicator, methylene blue, for the neutralizing absorption and decontamination of the organic chemical substance are included. More preferably, all of phenolphthalein, methyl orange or methyl red, and methylene blue are included, and specifically, these indicators may be included in equivalent amounts.

The color change indicator may be included in an amount of 0.01 to 0.02 parts by weight with respect to 100 parts by weight of the neutralizing absorbent for decontaminating a leaked chemical substance. When the content of the color change indicator is out of the above-described range, sensitivity to a color change, which is intended in the present invention, may be degraded.

In addition, optionally, a deodorant may be included in an amount of 0.1 to 3.0 parts by weight with respect to 100 parts by weight of the neutralizing absorbent for decontaminating a leaked chemical substance according to the present invention. Examples of the deodorant include particulate porous materials such as red shale powder and silicate mineral powder.

The inclusion of the ceramic deodorant may be useful in removing a bad odor generated during a decontamination process.

Method of Preparing Neutralizing Absorbent for Decontaminating Leaked Chemical Substance Next, a method of preparing the neutralizing absorbent for decontaminating a leaked chemical substance according to the present invention will be described.

FIG. 1 shows an exemplary flowchart of a preparation method of a neutralizing absorbent for decontaminating a leaked chemical substance according to the present invention, and the method of preparing a neutralizing absorbent for decontaminating a leaked chemical substance according to the present invention includes the steps of: a) mixing an inorganic adsorbent, a thickener, and a surfactant to prepare a neutralizing absorbent for decontamination; optionally b) mixing the neutralizing absorbent for decontamination with a color change indicator; c) drying the neutralizing absorbent for decontamination, which has been mixed with the indicator, so that a moisture content ranges from 5 to 10 wt %; and optionally d) formulating the dried neutralizing absorbent for decontamination with a desired particle diameter and form.

The neutralizing absorbent may be formulated in the form of a pellet or tablet using a compression molding machine, in the form of powder using a ball mill or the like, or in the form of granules or flakes using a granule molding machine or flake molding machine.

In this case, the components and composition ratio used in the method of preparing a neutralizing absorbent for decontaminating a leaked chemical substance according to the present invention are the same as the configurations of the above-described neutralizing absorbent for decontaminating a leaked chemical substance.

That is, a mixture including an inorganic adsorbent at 40 to 60 wt %, a thickener at 20 to 30 wt %, and a surfactant at 20 to 30 wt % is configured, and a color change indicator is included in an amount of 0.01 to 0.02 parts by weight with respect to 100 parts by weight of the mixture.

Figure 2:
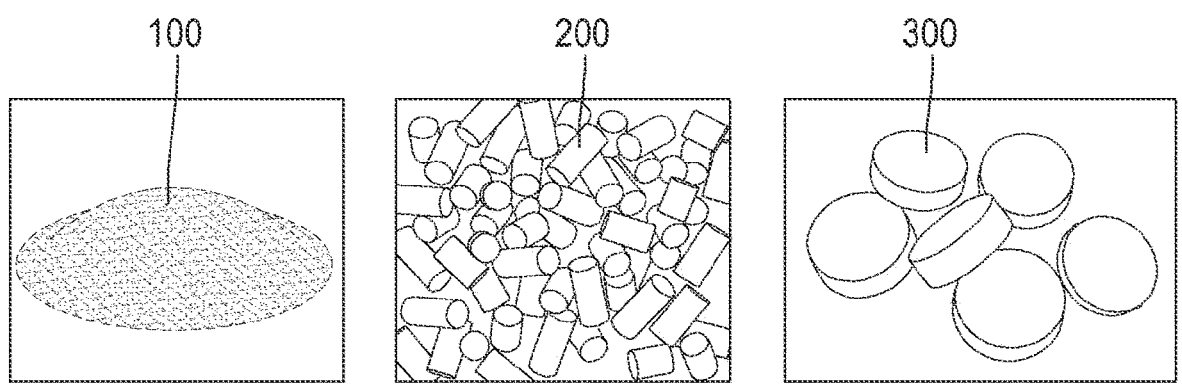
FIG. 2 shows an exemplary diagram of the formulation of a neutralizing absorbent for decontaminating a leaked chemical substance according to the present invention.

An example of the form of the neutralizing absorbent for decontaminating a leaked chemical substance according to the present invention, which is prepared by the method of preparing a neutralizing absorbent for decontaminating a leaked chemical substance according to the present invention, may refer to an enlarged view shown in FIG. 2, but this is only an example and does not limit the form of the neutralizing absorbent for decontaminating a leaked chemical substance according to the present invention.

Neutralizer Filled with Neutralizing Absorbent for Decontaminating Leaked Chemical Substance When an acidic, basic, or organic chemical substance, or any mixture thereof is accidentally leaked, the neutralizing absorbent for decontaminating a leaked chemical substance according to the present invention may be directly thrown or sprayed onto the leaked chemical substance by a person who takes an initial action. However, in terms of convenience of use and safety, it is preferable that the neutralizing absorbent is sprayed at a point at least 5 m away from the leaked chemical substance using a neutralizer in the form of a portable stored pressure fire extinguisher or a stored pressure powder sprayer, which is filled with the neutralizing absorbent for decontaminating a leaked chemical substance according to the present invention.

The neutralizer, such as a fire extinguisher, filled with the neutralizing absorbent for decontaminating a leaked chemical substance according to the present invention may be filled with nitrogen gas or an inert gas at a pressure of 7 to 9.8 kgf/cm$^2$. In addition, the neutralizer such as a stored pressure powder sprayer may be filled with nitrogen gas or an inert gas at a working pressure of up to 3 bar.

Figure 3:
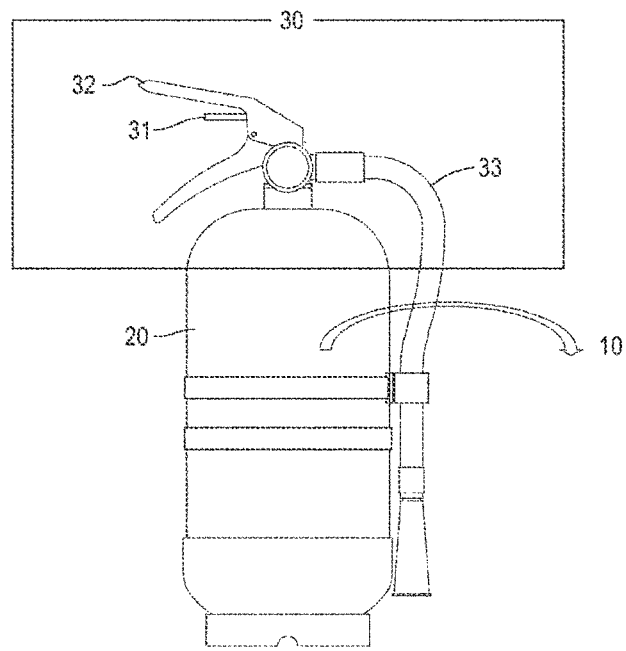
FIG. 3 shows an exemplary diagram of a neutralizer in the form of a fire extinguisher, which is filled with a neutralizing absorbent for decontaminating a leaked chemical substance according to the present invention.
Figure 4:
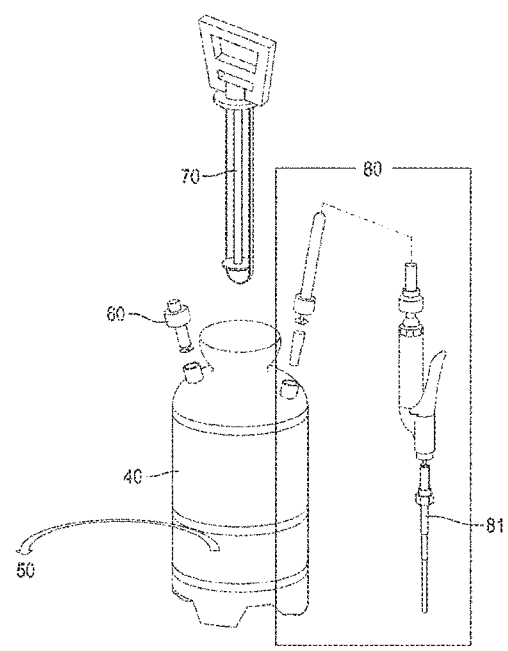
FIG. 4 shows an exemplary diagram of a neutralizer in the form of a stored pressure powder sprayer, which is filled with a neutralizing absorbent for decontaminating a leaked chemical substance according to the present invention.

FIGS. 3 and 4 show exemplary diagrams of neutralizers in the form of a fire extinguisher and a stored pressure powder sprayer, which are filled with the neutralizing absorbent for decontaminating a leaked chemical substance according to the present invention, respectively. Since their basic structures are known, an additional description thereof will be omitted.

Meanwhile, when compared with the related art shown in Table 1, the neutralizer in the form of a fire extinguisher or a stored pressure powder sprayer, which is filled with the neutralizing absorbent for decontaminating a leaked chemical substance according to the present invention has advantages of having less concerns about fatal accidents by spraying the neutralizing absorbent at a point at least 5 m away from the scene of the accident, having high convenience of use, enabling a prompt initial action, enabling immediate use at an urgent moment without the need for selection according to the differentiation of acidic, basic, and organic chemical substances, suppressing the evaporation of poisonous gas and liquid by including a surfactant, and having no concerns about secondary contamination because the neutralizing agent (chemical absorbent) is a solid non-toxic substance.

Example 1: Preparation of Neutralizing Absorbent for Decontaminating Leaked Chemical Substance With respect to the total weight of a neutralizing absorbent for decontaminating a leaked chemical substance, 50 wt % of zeolite as an inorganic adsorbent, 20 wt % of silica starch as a thickener, and 30 wt % of polyethylene glycol as a surfactant were homogeneously mixed for an hour using a ribbon mixer which is a powder mixer, and then the mixture was mixed with an indicator including equivalent weights of phenolphthalein, methyl orange, and methylene blue in an amount of 0.01 parts by weight with respect to 100 parts by weight of the mixture for 5 minutes.

The chemical neutralizing absorbent thus prepared was collected in a collecting part at the bottom of the mixer and dried so that a moisture content became 7 wt %, thereby preparing a neutralizing absorbent for decontaminating a leaked chemical substance.

Example 2: Preparation of Neutralizing Absorbent for Decontaminating Leaked Chemical Substance With respect to the total weight of a neutralizing absorbent for decontaminating a leaked chemical substance, 60 wt % of bentonite as an inorganic adsorbent, 20 wt % of silica gel as a thickener, and 20 wt % of polypropylene glycol as a surfactant were homogeneously mixed for an hour using a ribbon mixer which is a powder mixer, and then the mixture was mixed with an indicator including equivalent weights of phenolphthalein, methyl orange, and methylene blue in an amount of 0.02 parts by weight with respect to 100 parts by weight of the mixture for 5 minutes.

The chemical neutralizing absorbent thus prepared was collected in a collecting part at the bottom of the mixer and dried so that a moisture content became 7 wt %, thereby preparing a neutralizing absorbent for decontaminating a leaked chemical substance.

Comparative Example 1: Preparation of Neutralizing Absorbent for Decontaminating Leaked Chemical Substance A neutralizing absorbent for decontaminating a leaked chemical substance was prepared in the same manner and procedure as in Example 1, except that, with respect to the total weight of a neutralizing absorbent for decontaminating a leaked chemical substance, 80 wt % of zeolite as an inorganic adsorbent, 10 wt % of silica starch as a thickener, and 10 wt % of polyethylene glycol as a surfactant were used.

Comparative Example 2: Preparation of Neutralizing Absorbent for Decontaminating Leaked Chemical Substance A neutralizing absorbent for decontaminating a leaked chemical substance was prepared in the same manner and procedure as in Example 2, except that, with respect to the total weight of a neutralizing absorbent for decontaminating a leaked chemical substance, 50 wt % of bentonite as an inorganic adsorbent, 10 wt % of silica gel as a thickener, and 40 wt % of polypropylene glycol as a surfactant were used.

Test Example: Measurement of Absorption Rate with Respect to Acidic, Basic, and Organic Chemical Substances The absorption rates of the neutralizing absorbents for decontaminating a leaked chemical substance prepared in Examples 1 and 2 and Comparative Examples 1 and 2 per unit gram of acidic, basic, and organic chemical substances were measured. As reagents, concentrated hydrochloric acid (HCl, 35.4%), an aqueous sodium hydroxide solution (prepared by dissolving 20 g of a NaOH reagent in 100 ml of water), and benzene (99.5%) were used.

Results are shown in the following Table 2.

TABLE 2

| | HCl absorption rate (g/g) | NaOH absorption rate (g/g) | Benzene absorption rate (g/g) |
| --- | --- | --- | --- |
| Example 1 | 4.5 | 7.0 | 2.7 |
| Example 2 | 4.3 | 7.1 | 2.6 |
| Comparative Example 1 | 2.1 | 3.8 | 1.5 |
| Comparative Example 2 | 2.0 | 3.6 | 1.3 |

According to the results shown in Table 2, Examples 1 and 2 showed chemical absorption rates about 2 times higher than Comparative Examples 1 and 2.

It can be seen that when an excessive amount of inorganic adsorbent was used as in Comparative Example 1, the function of a thickener was degraded, thereby delaying gelation and lowering an absorption rate, and when an excessive amount of a surfactant was used as in Comparative Example 2, an absorption rate was lowered compared to Example 2.

A neutralizing absorbent for decontaminating a leaked chemical substance according to the present invention is effective in promptly and safely taking an initial action regardless of the type, nature, and characteristics of acidic, basic, and/or organic chemical substances leaked in the leakage accident of the chemical substance, and accordingly, is useful in preventing secondary accidents. Also, when the neutralizing absorbent is used, there are no concerns about the spread of contamination due to water generated by an acid-base reaction, concerns about the additional occurrence of secondary contamination due to a decontaminating agent can be minimized by using a non-toxic chemical absorbent, and a decontamination process can be visually checked in real time regardless of the type, nature, and characteristics of the leaked chemical substance.

Furthermore, when a neutralizer filled with the neutralizing absorbent for decontaminating a leaked chemical substance according to the present invention is used, the leaked chemical substance can be more safely and effectively decontaminated during an initial action.

While the present invention has been described by way of exemplary embodiments, those of ordinary skill in the art will appreciate that various modifications and applications not illustrated above are possible without departing from the essential characteristics of the present invention. Therefore, the embodiments should be considered in a descriptive sense only and not for purposes of limitation. The scope of the present invention is defined not by the detailed descriptions of the present invention but by the following claims, and all differences within the scope will be construed as being included in the present invention.

[List of Reference Numerals]

10, 50: neutralizing absorbent for decontaminating leaked chemical substance according to the present invention
20, 40: body
30, 80: discharge unit
31: safety pin
32: lever
33, 81: discharge hose
60: safety valve
70: piston pump
100: neutralizing absorbent for decontaminating leaked chemical substance according to the present invention (powder)
200: neutralizing absorbent for decontaminating leaked chemical substance according to the present invention (pellet)
300: neutralizing absorbent for decontaminating leaked chemical substance according to the present invention (tablet)

What is claimed is:

1. A neutralizing absorbent for decontaminating a leaked chemical substance comprising:
    100 parts by weight of a neutralizing absorbent for decontamination, including an inorganic adsorbent, which is usable in neutralizing absorption of at least one chemical substance selected from the group consisting of acidic, basic, and organic chemical substances, at 40 to 60 wt %, a thickener at 20 to 30 wt %, and a surfactant at 20 to 30 wt %, with respect to the total weight of the neutralizing absorbent for decontamination ; and
    0.01 to 0.02 parts by weight of a color change indicator including methyl red or methyl orange, methylene blue, and phenolphthalein,
    wherein the inorganic adsorbent is at least one inorganic adsorbent selected from the group consisting of zeolite, alumina, perlite, and bentonite, and
    the neutralizing absorbent for decontaminating a leaked chemical substance is formulated in a solid state.

2. The neutralizing absorbent of claim 1, wherein the thickener is at least one selected from the group consisting of silica gel, silica starch, starch, natural cellulose, and gelatin,
    the surfactant is polyethylene glycol, propylene glycol, or a mixture of polyethylene glycol and propylene glycol, and
    the color change indicator further includes a natural indicator.

3. The neutralizing absorbent of claim 1, wherein the neutralizing absorbent for decontaminating a leaked chemical substance has a moisture content of 5 to 10 wt %.

4. The neutralizing absorbent of claim 1, wherein the inorganic adsorbent has an average particle diameter of 30 µm to 100 µm, and the neutralizing absorbent for decontaminating a leaked chemical substance is formulated in a form of powder having an average particle diameter of 30 µm to 100 µm, a grain having an average particle diameter of 0.5 mm to 1.0 mm, or a pellet, granule, flake, or tablet having an average particle diameter of 1.5 to 3.0 mm.

5. A method of preparing a neutralizing absorbent for decontaminating a leaked chemical substance, comprising the following steps of:
    a) homogeneously mixing 40 to 60 wt % of at least one inorganic adsorbent selected from the group consisting of zeolite, alumina, perlite, and bentonite with an average particle diameter of 30 µm to 100 µm, which is commonly usable in neutralizing absorption of at least one chemical substance selected from the group consisting of acidic, basic, and organic chemical substances, 20 to 30 wt % of a thickener, and 20 to 30 wt % of a surfactant to prepare a neutralizing absorbent for decontamination;
    b) mixing 100 parts by weight of the neutralizing absorbent for decontamination with 0.01 to 0.02 parts by weight of a color change indicator including methyl red or methyl orange, methylene blue, and phenolphthalein;
    c) performing drying so that a moisture content is 5 to 10 wt % based on the total weight of the dried neutralizing absorbent for decontamination which includes the color change indicator; and
    d) formulating the dried neutralizing absorbent for decontamination, which includes the color change indicator, in a form of powder having an average particle diameter of 30 µm to 100 µm, a grain having an average particle diameter of 0.5 mm to 1.0 mm, or a pellet, granule, flake, or tablet having an average particle diameter of 1.5 to 3.0 mm.

6. A neutralizer for decontaminating a leaked chemical substance, which is filled with the neutralizing absorbent for decontaminating a leaked chemical substance according to claim 1 together with an inert gas or nitrogen gas and is in a form of a fire extinguisher or a stored pressure powder sprayer.

* * * * *